E. A. JEFFREY.

Coal Hod.

No. 4,147. Reissued Oct. 4. 1870.

Witnesses.
J. H. Shumway
A. J. Tibbits

Edwin A. Jeffrey
Inventor
By his Attorney.
John E. Earl

N. PETERS, Photo-Lithographer, Washington, D. C.

UNITED STATES PATENT OFFICE.

EDWIN A. JEFFERY, OF NEW HAVEN, CONNECTICUT.

IMPROVEMENT IN COAL-HODS.

Specification forming part of Letters Patent No. 52,856, dated February 27, 1866; Reissue No. 4,147, dated October 4, 1870.

*To all whom it may concern:*

Be it known that I, EDWIN A. JEFFERY, of New Haven, in the county of New Haven and State of Connecticut, have invented a new Improvement in Coal-Hods; and I do hereby declare the following, when taken in connection with the accompanying drawings and the letters of reference marked thereon, to be a full, clear, and exact description of the same, and which said drawings constitute part of this specification, and represents in—

Figure 1:
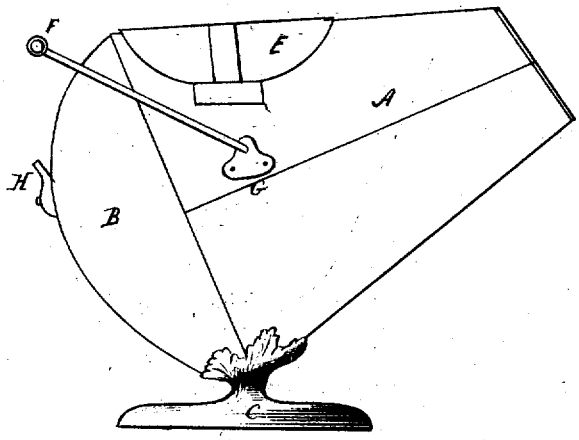
Figure 2:
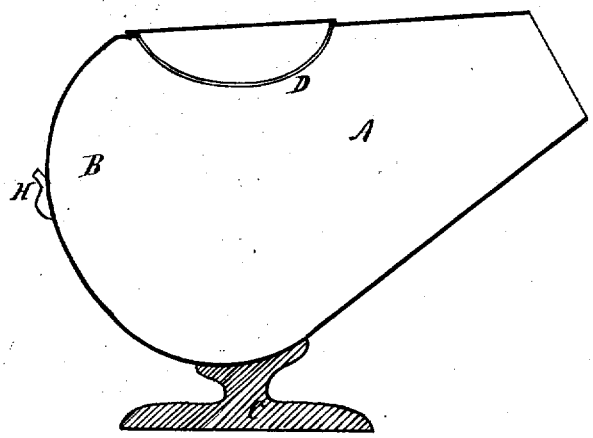

Figure 1 a side view, and in Fig. 2 a longitudinal vertical central section.

In coal-hods as generally constructed the bottom lies horizontal, and forms a sharp angle with the sides entirely around the bottom, into which angle the coal-dust settles and clings and soon destroys the metal adjacent thereto, and thus renders the hod useless.

The object of my invention is to produce a coal-hod of such form and construction as to overcome this objection; and, further, so that when the hod is used for charging stoves or other fires the coal within the hod will be conducted to the fire without falling or scattering in other directions, as from hods of common construction.

This invention consists in constructing the body of the hod of the form of a frustum of a cone, its larger end closed and the smaller end open, forming a spout, through which to discharge the coal, and constructed with an opening upon the top, through which to insert the coal.

A is a cylinder of sheet metal of conical form, its base closed by a disk, B, of like metal to form the rear end of the hod, its upper or smaller end open to form the mouth for discharge of the coal. This mouth may be closed by a lid or not, as required. Thus shaped I secure the hod to a foot, C, of any common form in an inclined position, as seen in Fig. 1, so that the angle formed by uniting the body A with the rear B stands nearly in a vertical position. Upon the upper side of the body I form an opening, D, and close it with a lid or cover, E, hinged to the cylinder, and secured thereto in any convenient manner, and provide a bale, F, hinged to ears G in the usual manner. This completes the construction of the hod. The cover E is not essential to the lid, yet when closed it prevents the escape of dust therefrom.

Through the opening D the hod is filled in the usual manner, and the cover E closed, and when it is required to supply coal to the fire from the hod it is only necessary to tip the hod thereto in the usual manner. The top of the hod is entirely covered, and no part of the coal or dust can escape therefrom.

For convenience of handling, a handle, H, is placed upon the rear end of the hod.

The form of the rear end of the hod I have shown, and prefer to make spherical, as this form gives a better shape to the joint between the two parts, and produces but a slight angle, and may be so shaped that no angle will exist, whereby the first object of my invention is accomplished; yet other forms for the rear end may be substituted with nearly equal advantages when the hod is set upon the base in the manner described.

I claim as my invention—

A coal-hod the body of which is in shape the frustum of a cone, the base or larger end closed, the smaller end serving as a conductor for discharge of the coal, and an opening formed upon the top for the introduction of coal into the hod, substantially in the manner set forth.

EDWIN A. JEFFERY.

Witnesses:

WILLIAM RUSSELL,

JAMES DUNNE.